United States Patent [19]

Spanio

[11] Patent Number: 5,048,366

[45] Date of Patent: Sep. 17, 1991

[54] MODULAR CAMSHAFT WITH REMOVABLE CAMS, PARTICULARLY FOR CIRCUIT BREAKERS AND ELECTRICAL CHANGEOVER SWITCHES OR THE LIKE

[75] Inventor: Marino Spanio, Cusano Milanino, Italy

[73] Assignee: Bremas S.p.A., Italy

[21] Appl. No.: 498,954

[22] Filed: Mar. 26, 1990

[30] Foreign Application Priority Data

Jan. 1, 1990 [ITx] Italy .......................... 19102A/90

[51] Int. Cl.[5] ................................................ F16H 53/08
[52] U.S. Cl. .................................... 74/567; 74/568 R; 403/359; 123/90.34
[58] Field of Search ................................ 74/567–569; 403/359, 361; 123/90.34, 90.6

[56] References Cited

U.S. PATENT DOCUMENTS

| | | | |
|---|---|---|---|
| 1,955,233 | 4/1934 | Gilbert | 74/568 |
| 2,382,765 | 8/1945 | Zahodiakin | 74/568 |
| 2,791,916 | 5/1957 | Kintzing | 74/568 |
| 2,978,553 | 4/1961 | Bundy et al. | 74/568 |
| 3,128,638 | 4/1964 | King | 74/568 |
| 3,287,031 | 11/1966 | Simmons et al. | 403/359 |
| 3,325,609 | 6/1967 | Otterlei | 74/568 T |
| 3,640,148 | 2/1972 | Fischbach | 403/359 |
| 3,742,656 | 7/1973 | Amos | 403/359 |
| 4,318,630 | 3/1982 | Herchenbach et al. | 403/359 |
| 4,730,952 | 3/1988 | Wiley | 403/359 |

Primary Examiner—Allan D. Herrmann
Assistant Examiner—Winnie Yip
Attorney, Agent, or Firm—Steinberg & Raskin

[57] ABSTRACT

A modular camshaft comprises at least two modular elements or modules removably coupled together; each module carries at least one cam and comprises two cylindrical elements disposed on the same axis and projecting in opposite directions from opposing faces of said cam, a first cylindrical element acting as a hub and the second being hollow and acting as a seat, the seat of one modular element being arranged to receive the hub of the other module so as to define the camshaft, on each hub there being provided means which cooperate with counter-means provided in each seat to torsionally lock said two modular elements together. According to the invention the camshaft comprises, between two consecutive cams, at least one annular element spaced from said cams and removably mounted on one of the two cylindrical elements of each module, said annular element comprising in its outer edge at least one recess so as to act as an additional cam, and comprising in its inner edge means for torsionally locking it to the cylindrical element on which said element or removable cam is mounted.

7 Claims, 2 Drawing Sheets

MODULAR CAMSHAFT WITH REMOVABLE CAMS, PARTICULARLY FOR CIRCUIT BREAKERS AND ELECTRICAL CHANGEOVER SWITCHES OR THE LIKE

BACKGROUND OF THE INVENTION

This invention relates to a camshaft, particularly for use in circuit breakers electrical changeover switches or the like. In particular, the present invention relates to a camshaft comprising at least two modular elements or modules coupled together. Each module carries at least one cam and comprises two cylindrical elements disposed on the same axis and projecting in opposite directions from opposing faces of said cam, a first cylindrical element acting as a hub and the second being hollow and acting as a seat, the seat of one modular element being arranged to receive the hub of the other module so as to define the camshaft, on each hub there being provided means which cooperate with counter-means provided in each seat to torsionally lock said two modular elements together.

These modules can in particular be made hollow to allow them to be mounted on a further shaft generally of square of polygonal cross-section, connected to a knob or the like. In this manner, by rotating the knob the camshfat rotates to cause said cams to act on known contacts associated with the electrical changeover switch or the like.

Such a system generally involves the use of modules with cams arranged in predetermined positions. This is very convenient if camshafts of standard type are required, but creates problems if the positions of the cams on the shafts do not correspond with the positions of the electrical contacts.

Again, if a camshaft is used in known measuring devices comprising proximity sensors, the use of camshafts consisting of modules with cams in predetermined positions is often impossible. In this respect, there is often not sufficient space to arrange the sensors at the cams, and it is not even possible to bring them close because of the predetermined positioning of the cams on said camshaft.

Camshafts of the aforesaid type can, with obvious particular modifications, also be generally used in the mechanical field, where the problems due to the predetermined positioning of the cams on the camshaft are even more apparent.

SUMMARY OF THE INVENTION

An object of the present invention is therefore to provide a camshaft in which the position of the cams can be varied at will, or rather to provide a camshaft on which additional cams can be arranged according to requirements.

A further object is to provide a camshaft which is simple to construct and use, and is of very versatile application so enabling it to be used in the most diverse situations and in the most different fields with consequent reduction in the cost of the electrical or mechanical equipment in which it is used. A further object is to provide a camshaft of the aforesaid type which is of low cost and of considerable reliability in use. These and further objects which will be apparent to one skilled in the art are attained by a camshaft of the aforesaid type, comprising, between two consecutive cams, at least one annular element spaced from said cams and removably mounted on one of the two cylindrical elements of each module, said annular element comprising in its outer edge at least one recess so as to act as an additional cam, and comprising in its inner edge means for torsionally locking it to the cylindrical element on which said element or removable cam is mounted.

BRIEF DESCRIPTION OF THE DRAWINGS

The present invention will be more apparent from the accompanying drawing which is provided by way of non-limiting example only, and in which.

DESCRIPTION OF THE PREFERRED EMBODIMENTS

Figure 1:
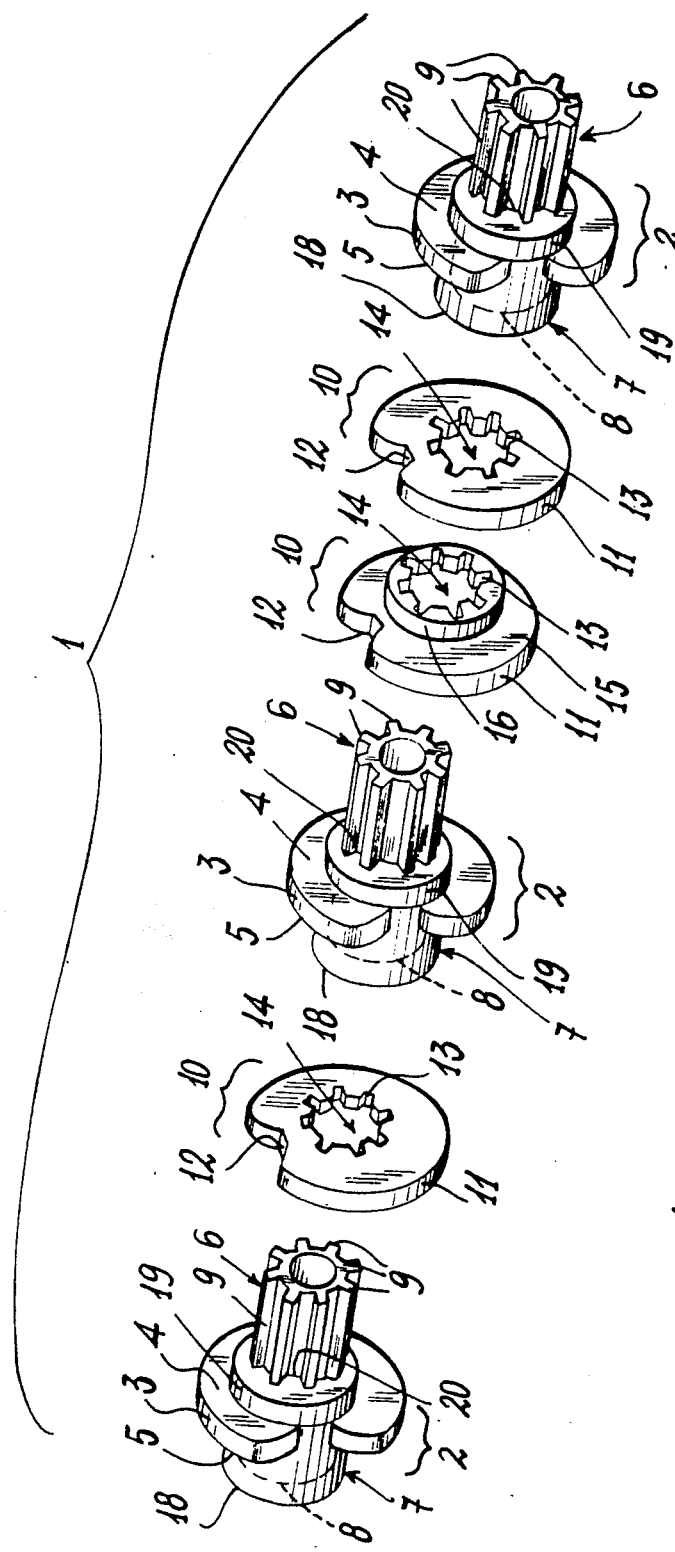
FIG. 1 is an exploded perspective view of a camshaft constructed in accordance with the invention.
Figure 2:
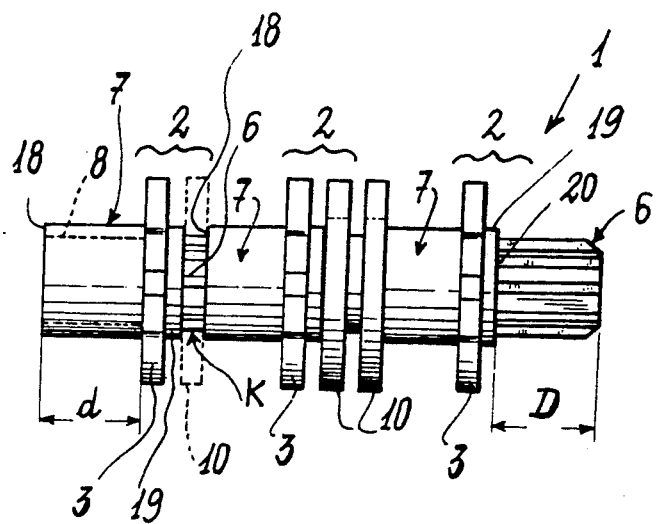
FIG. 2 is a side view of the assembled camshaft of FIG. 1, but with a part removed for greater clarity.

In FIGS. 1 and 2 the reference numeral indicates overall a camshaft. This is composed of a series of modular elements or modules 2, each comprising a cam 3. A first and a second cylindrical element project from opposing faces 4 and 5 of each cam 3, and are indicated by 6 and 7 respectively. Specifically, the first cylindrical element 6 acts as a hub and is arranged to cooperate with the second element 7, which for this purpose comprises a cavity 8 arranged to receive the element or hub 6. The second element 7 therefore acts as a seat for the hub 6.

It should be noted that both the hub 6 and the respective seat 7 are provided with a series of longitudinal grooves 9 (only those of the hubs 6 are shown in the figures) so that when two consecutive modules 2 are coupled together they become torsionally locked to each other.

According to the invention, at least one additional removable cam, disposed between two consecutive cams 3, can be associated with the camshaft 1.

More specifically, the additional cam 10 consists of a removable annular element provided in its outer edge 11 with at least one recess 12 and provided in its inner edge 13 with toothing 14 arranged to cooperate with the grooves 9 of a hub 6. In at least one face 15 of said element or cam 10 there can be provided a collar 16 to act as a spacer if two cams 10 are to be disposed on a single hub 6.

For this purpose. i.e. to form the seat for the additional cam 10, according to one embodiment of the invention each hub 6 has a length D (see FIG. 2) greater than the depth d of each cavity 8 in the seats 7. In this manner, on inserting each hub into the respective seat a space K for housing the annular element or cam 10 is formed between the free edge 18 of this latter seat and a step 19 provided at that end 20 of said hub close to the cam 3. It will now be assumed that cams 10 are to be added to the camshaft 1.

To achieve this, a first cam 10 (that to the extreme left in FIGS. 1 and 2) is placed on the hub 6 of a module 2 and the hub inserted into the seat 7 of another module (the central one in said figures).

In this manner the cam 10 is clamped between the step 19 of the first module and the end 18 of the seat 7 of the second modular element 2. If this latter is chosen with a hub 6 having a dimension D much greater than the dimension d of the cavity 8 in the seat 7, then on fitting said modular element to another similar one (that to the extreme right in FIGS. 1 and 2) a space K of relatively large dimensions is created to house two annular elements or cams 10.

In this case at least one of said cams is provided on that face 15 with the collar 16 to keep the cams 10 spaced apart in the desired manner.

By such means, two cams 10 can be mounted on the hub 6 of a module 2 (the central one in the figures). These cams are locked axially by the step 19 of said modular element 2 and by the end 18 of the seat 7 of the other modular element (that on the extreme right in FIGS. 1 and 2).

The invention also covers an arrangement in which in place of the collar 16 associated with the cam 10, a ring acting as a spacer is provided having an inner edge shaped so that it can be mounted rigidly on a module 2. By interposing several rings between two cams 10 and choosing a module 2 in which the hub 6 has a sufficient dimension D, several adjacent removable cams can be removably arranged on said hub.

Figure 3:
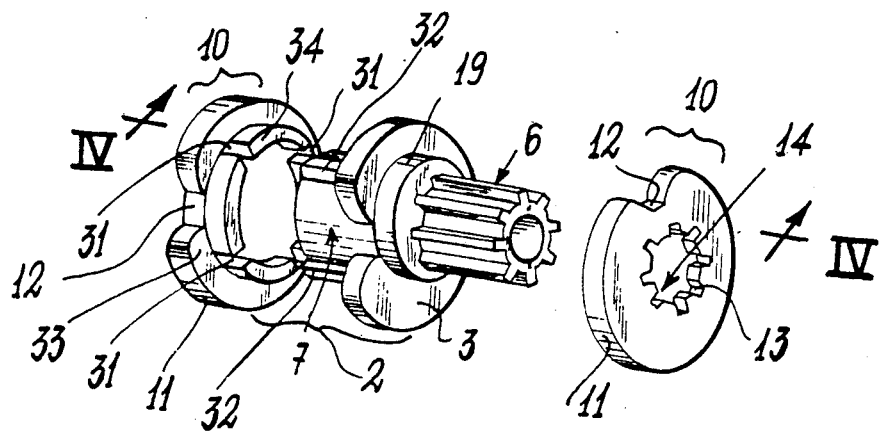
FIG. 3 is an exploded view of part of a second embodiment of a camshaft constructed in accordance with the invention.
Figure 4:
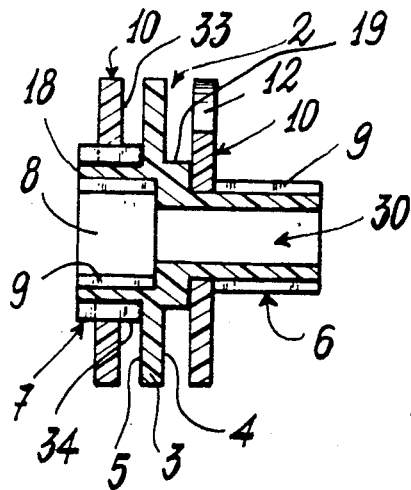
FIG. 4 is a sectional view taken on the line 4—4 of FIG. 3.

FIGS. 3 and 4 show part of a different embodiment of a camshaft 1 according to the invention. In these figures, parts corresponding to those of FIGS. 1 and 2 are indicated by the same reference numerals.

In the figures under examination the module 2 is of the type suitable for forming a camshaft for mounting on the shaft of a changeover switch (or switching shaft) operated by a knob (not shown). For this reason the module is provided with a through bore 30 for receiving said switching shaft.

In the embodiment shown in FIGS. 3 and 4 the removable additional cam 10 is mounted on the seat 7 of the module 2. This cam 10 is provided in its inner edge 13 with recesses 31 to receive ribs 32 provided on said seat 7, the cooperation between said recesses and ribs providing the torsional locking between the cam 10 and module 2.

Finally, the removable cam 10 comprises at least on one face 33 a collar 34 to act as a spacer between said cam and that of the module 2.

The use of the camshaft constructed in accordance with this latter embodiment of the invention is identical to that of FIGS. 1 and 2 and will therfore not be described.

It should be noted that if the invention is used in electrical changeover switches or the like, the camshaft 1 and its components can be advantageously of molded plastics construction. This makes it simple to obtain different forms of torsional locking elements between the removable cams and the modules 2. A camshaft according to the invention is of considerable versatility of application, is of low construction cost and is very reliable in use.

What I claim is:

1. A camshaft comprising at least two modules coupled together, each carrying at least one cam and comprising two cylindrical elements disposed on a same axis and projecting in opposite directions from opposing faces of said cam, a first cylindrical element acting as a hub and a second cylindrical element being hollow and acting as a seat, the seat of one module being arranged to receive the hub of the other module so as to define the camshaft, each hub having integral thereto means which directly contact cooperate with means integral to each seat to by said means alone torsionally lock said two modules together, and further comprising, between two of said cams, at least one annular element spaced from said cams and removably mounted on one of the two cylindrical elements of each module, each said annular element comprising in its outer edge at least one recess so as to act as an additional cam, and comprising it its inner edge means for torsionally locking it to the cylindrical element on which said annular element is mounted and wherein removal, replacement, or readjustment of each said annular element requires disassembly of said camshaft.

2. A camshaft as claimed in claim 1, wherein each hub of each module has a length which exceeds a depth of a cavity in the respective seat, a space for removably receiving said at least one annular element being created between a free edge of said seat and a step close to the cam of said module by an insertion of said hub into said cavity.

3. A camshaft as claimed in claim 1, wherein said at least one additional cam comprises a collar on at least one of its faces.

4. A camshaft as claimed in claim 1, wherein the means for torsionally locking said at least one additional cam to the cylindrical element of each module is plurality of recesses and/or projections arrange to cooperate with respective projections and/or recesses provided in said cylindrical element.

5. A camshaft as claimed in claim 1, wherein the means for torsionally locking said at least one additional cam to the hub of each module comprises a set of teeth cooperating with longitudinal grooves provided in said hub.

6. A camshaft as claimed in claim 1, further comprising, between two removable said additional cams disposed on one of said two cylindrical elements of said module, an annular spacer element removably mounted on said cylindrical element.

7. The camshaft of claim 1, wherein said means integral to each hub comprises a plurality of longitudinal projections on an the outer surface of said hub and said means integral to each seat comprises a plurality of longitudinal grooves on an the inner surface of said seat.

* * * * *